Jan. 7, 1936.  C. W. CRUMRINE  2,027,332
AUTOMATIC FILM STOP FOR CAMERAS
Filed April 30, 1935
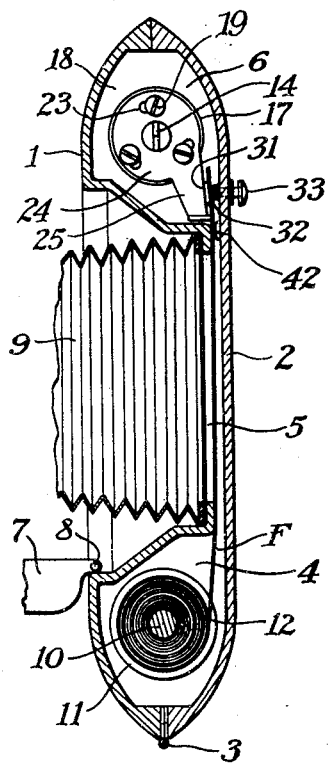
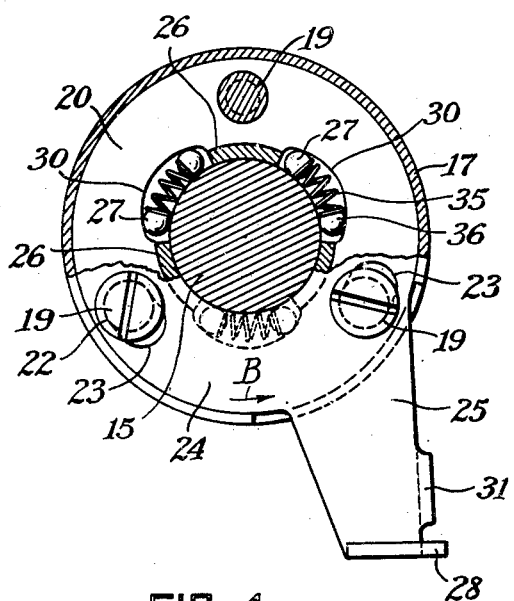
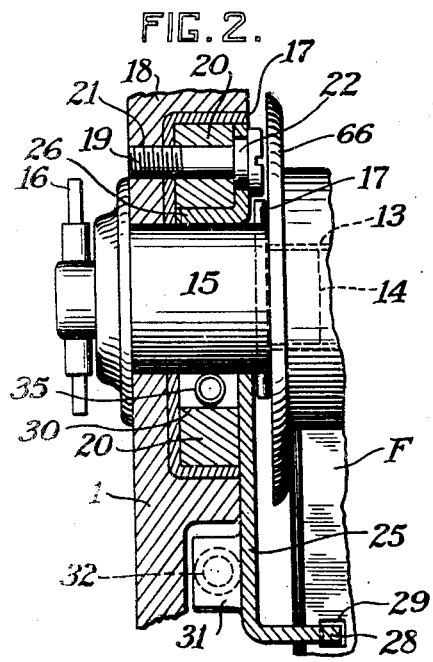
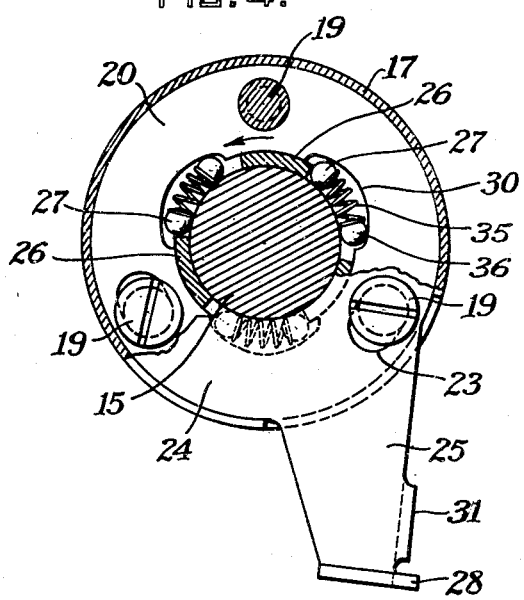
INVENTOR.
Chester W. Crumrine
BY
ATTORNEYS Patented Jan. 7, 1936

2,027,332

UNITED STATES PATENT OFFICE 2,027,332

AUTOMATIC FILM STOP FOR CAMERAS

Chester W. Crumrine, Rochester, N. Y., assignor to Eastman Kodak Company, Rochester, N. Y., a corporation of New York Application April 30, 1935, Serial No. 19,011

9 Claims. (Cl. 95—31)

This invention relates to photography and more particularly to photographic cameras in which film is wound past an exposure frame for exposing successive sections thereof. One object of my invention is to provide a camera with a suitable film latch which will prevent the operation of a film winding key. Another object of my invention is to provide a simple type of clutch mechanism which may prevent the operation of the film winding key in either one or two directions. Another object of my invention is to provide a clutch mechanism under the control of an arm adapted to engage a film aperture for preventing operation of the film winding key. Still another object of my invention is to provide a film latching device using one of two clutches surrounding the winding key shaft to permit the operation of the winding key shaft in only one direction and at intermittent intervals, and other objects will appear from the following specification, the novel features being particularly pointed out in the claims at the end thereof.

In cameras of the roll film type and particularly in small size and miniature cameras it is somewhat difficult to wind the film accurately to present fresh areas of film for exposure because relatively slight overwinding will cause the exposure areas to partially overlap. This is more true of the small size cameras because there is less clearance allowed between the exposure areas than there is in cameras utilizing the larger sizes of film. Consequently, it has been found desirable to provide a means for automatically stopping the film winding operation at the desired time, and my present invention is for an improvement over cameras embodying such a winding system, as shown, for instance, in the following two patents: 1,997,332 Green April 9, 1935; 1,997,333 Hultquist, et. al. April 9, 1935.

Coming now to the drawing wherein like reference characters denote like parts throughout:

Fig. 1 is a sectional view through a camera constructed in accordance with, and embodying a preferred form of my invention;

Fig. 2 is an enlarged fragmentary sectional view through the winding key of the camera shown in Fig. 1;

Fig. 3 is an enlarged fragmentary view partially in section and partially in elevation showing the winding key clutch construction and the clutch controlling arm with the parts in a non-winding position; and Fig. 4 is a view similar to Fig. 3 but with the parts in a film winding position.

In accordance with my invention I provide a simple type of clutch mechanism designed to permit the operation of the film winding key to wind film upon a takeup spool only when the latching mechanism is manually released. When the control for the clutch passes through an aperture in the film, the winding mechanism is locked against movement until the control is released. A second clutch arrangement is provided to prevent the winding key at all times from turning in a reverse direction.

In illustrating a preferred embodiment of my invention I have applied it to a so called "miniature" type of roll film camera which may consist of a body portion 1 to which a camera back 2 may be attached by means of a hinge 3 so that the back may be swung open for loading film into a supply spool chamber 4 from which it may be wound past an exposure frame 5 into a takeup spool chamber 6. The camera may also be provided with the usual camera bed 7 hinged at 8 and the usual bellows 9 connecting the exposure frame 5 with the lens board as is usual with such cameras but which is not herein shown.

In the supply film chamber 4 a film spool consisting of a hub member 10 and flanges 11 may be mounted in the usual manner with convolutions of film and backing paper 12 wound thereon.

In loading the camera the film band indicated broadly as F is drawn over the exposure frame 5 and is attached to a takeup spool 66 in the spool chamber 6. This spool includes a slot 13, engaging a winding key web 14 carried by the winding key shaft 15 to which there is attached, on the outside of the camera, a winding key 16. The winding key shaft 15 may be provided with a pin 17 to hold it against withdrawal from the camera, also permitting the shaft 15 to turn freely in the wall of the camera.

In accordance with my invention I provide a clutch mechanism about the winding key shaft 15. This may consist of the following parts:

An annular shell 17 is sunk into a camera wall 18 and is fastened in place by the screws 19 which after passing through a clutch block 20 have a threaded connection at 21 with the camera wall. The screws 19 have shoulders 22 which pass through the arcuate slots 23 in part 24 of an arm 25 which controls the operation of clutch.

Around the inner edge of part 24 the arm 25 is provided with one or more downwardly extending fingers 26 which may engage one or more clutch elements 27 when the arm 25 is in one of two positions.

As above noted the arm 25 may swing a short distance about the shaft 15 by reason of the slots 23 moving about the screws 19. In one of these positions, as shown in Fig. 3, the shaft 15 is locked against turning by means of the control arm 25. The reason for this is that arm 25, at the end opposite from the fingers 26, carries a finger 28 or latch adapted to pass through a film aperture 29 as shown in Fig. 2.

However, when the film is to be wound the control arm 25 is moved to the position shown in Fig. 4, wherein the fingers 26 thrust the clutch elements 27 away from the locking cams 30 carried by the clutch block 20 and permitting the shaft 15 to be turned in the direction shown by the arrow to wind film on the takeup spool 66. To accomplish this movement the control arm 25 may be manually moved from the outside of the camera in the following manner:

The arm 25 is provided with an offset flange 31 which lies directly over an end 32 of a spring plunger 33 normally thrust out from the camera back 2, but capable of being pushed toward the back 2 so that the pressure of the spring plunger 32 upon the offset flange 31 will move the control arm 25 to the extent permitted by the slots 23 and the screws 19. Thus, each time it is desired to wind a fresh area of film in front of the exposure frame 5 the button 28 is depressed.

The clutch elements 27 are normally held in locking engagement (as shown in Fig. 3) with the clutch block cams 30 by means of coiled springs 35. These springs also thrust in an opposite direction upon the clutch elements 36. However, the fingers 26 never reach the clutch elements 36 and consequently, these elements can not be released from locking engagement with the cams 30 so that reverse movement or movement of shaft 15 in a direction opposite to that shown by the arrow in Fig. 4 is always prevented. Clutches for this purpose are well known, and the second clutch member which is the clutch member for preventing reverse winding, is only of interest in the present application because of its combination with the first mentioned clutch member which may be manually and intermittently actuated.

It should be noted that one or more springs 35, according to the number of clutch elements which are used, here shown as three springs 35, are the only springs used in my improved film latching device. Thus, these springs tend to hold the control element 25, or tend to thrust the element in the direction shown by the arrow B in Fig. 3, with the engaging finger 28 engaged in a film aperture 29.

Some means should be provided on the camera back 2 for preventing the film from merely bending away from the exposure frame 5 when the arm 25 is moved by the springs 35, so that finger 28 engages the surface of the film or backing paper. Accordingly, in the present embodiment of my invention I have provided a small pad 42 which will hold the film substantially in the desired plane. This pad is so shaped that the finger 28 can easily pass through the film when an aperture 29 comes opposite the finger 28.

The operation of my improved camera is as follows:

After threading a film through the camera, the finger 28, through its engagement with an unperforated portion of the film F, is held in the position shown in Fig. 4 so that the winding clutch elements 27 are held out of locking engagement with the cams 30. The winding key 16 may be freely turned so that the shaft 15, through the winding key 14 and slot 13 in the takeup spool 66, may rotate and wind an area of film into position for exposure. This winding operation continues until finger 28 drops into an aperture 29 in the film at which time the fingers 26 move away from the clutch elements 27 and the control arm 25 assumes the position shown in Fig. 3 in which the clutch elements 27 engage cams 30 and lock the shaft against further rotation. After making an exposure in the usual manner the button 33 is depressed, swinging the arm 25 to its winding position as shown in Fig. 4, and the operation of winding the next film area into place before the exposure frame 5 may be accomplished by repeating the same operation.

After all of the exposure areas have been wound through the camera, the arm 25 will remain in the position shown in Fig. 4, so that the remaining film and paper may be wound through the camera without the key locking, since the finger 28 will contact with the inside of the unperforated film or paper.

It is obvious that various changes can be made from the preferred embodiment of my invention shown in the drawing and described above and I contemplate as within the scope of my invention all such forms as may come within the scope of the appended claims.

What I claim is:

1. In a camera adapted for use with roll film having a perforation therein for each exposure, the combination with a camera body, of spool chambers included in the body, a winding key shaft extending through a wall of said chamber, an arm mounted to turn a limited distance about the key shaft, a clutch member between the arm and key shaft and finger on said arm adapted to pass through a film aperture and control the clutch, whereby rotation of the key shaft in a direction to wind film may be prevented when the finger lies in a film aperture.

2. In a camera adapted for use with roll film having a perforation therein for each exposure, the combination with a camera body, of spool chambers included in the body, a winding key shaft extending through a wall of said chamber, an arm mounted to turn a limited distance about the key shaft, a clutch member between the arm and key shaft and finger on said arm adapted to pass through a film aperture and control the clutch, whereby rotation of the key shaft in a direction to wind film may be prevented when the finger lies in a film aperture, and means for moving the arm to move the finger from the film aperture releasing the clutch member whereby the key shaft may be turned to wind a fresh film area in place.

3. In a camera adapted for use with roll film having a perforation therein for each exposure, the combination with a camera body, of spool chambers included in the body, a winding key shaft extending through a wall of said chamber, an arm mounted to turn a limited distance about the key shaft, a clutch member between the arm and key shaft and finger on said arm adapted to pass through a film aperture and control the clutch, whereby rotation of the key shaft in a direction to wind film may be prevented when the finger lies in a film aperture, means for moving the arm to move the finger from the film aperture releasing the clutch member whereby the key shaft may be turned to wind a fresh film area in place, and a second clutch member at all times preventing rotation of the winding key shaft in one direction.

4. In a camera adapted for use with roll film having a perforation therein for each exposure, the combination with a camera body, of spool chambers included in the body, a winding key shaft extending through a wall of said chamber, a clutch block carried by the spool chamber, clutch elements between the clutch block and winding key shaft adapted to prevent rotation of said shaft in either direction, and means for releasing one clutch element comprising an arm adapted to engage a clutch element and the film, said arm moving from engagement with said clutch element when the film engaging part passes from an aperture in said film whereby said key shaft may be turned in one direction to wind film.

5. In a camera adapted for use with roll film having a perforation therein for each exposure, the combination with a camera body, of spool chambers included in the body, a winding key shaft extending through a wall of said chamber, a clutch block carried by the spool chamber, clutch elements between the clutch block and winding key shaft adapted to prevent rotation of said shaft in either direction, and means for releasing one clutch element comprising an arm mounted to turn about said key shaft and including a clutch element engaging finger and a film engaging finger both so positioned that when said finger engages the film the finger engaging the clutch member will render the latter inoperative and when the finger passes through an aperture in a film said clutch member will be operative and prevent movement of the winding key shaft.

6. In a camera adapted for use with roll film having a perforation therein for each exposure, the combination with a camera body, of spool chambers included in the body, a winding key shaft extending through a wall of said chamber, a clutch block surrounding a portion of the key shaft clutch elements between the key shaft and clutch block, a spring for holding the clutch elements in an operative position to prevent rotation of the shaft in either direction, an arm pivotally mounted to turn a limited distance including a finger adapted to contact with a clutch element and a finger adapted to contact with a film, the spring acting on the clutch elements also tending to thrust the arm toward the film.

7. In a camera adapted for use with roll film having a perforation therein for each exposure the combination with a camera body, of spool chambers included in the body, a winding key shaft extending through a wall of said chamber, a clutch block surrounding a portion of the key shaft clutch elements between the key shaft and clutch block, a spring for holding the clutch elements in an operative position to prevent rotation of the shaft in either direction, an arm pivotally mounted to turn a limited distance including a finger adapted to contact with a clutch element and a finger adapted to contact with a film, the spring acting on the clutch elements also tending to thrust the arm toward the film, and means extending outside of the camera for moving said arm against the spring pressure to a position in which the clutch elements are inoperative whereby the key shaft may be held against movement when said finger passes through a film aperture.

8. In a camera adapted for use with roll film having a perforation therein for each exposure, the combination with a camera body, of spool chambers included in the body, a winding key shaft extending through a wall of said chamber, an arm mounted to turn a limited distance about the key shaft, a clutch block including a plurality of cam surfaces disposed about the key shaft, rotatable clutch elements between the cams and key shaft, springs tending to hold pairs of clutch elements in position to prevent the key shaft from turning in either direction, the arm including a plurality of fingers adapted to contact with certain clutch elements and to move them against the spring thrust from the cams whereby the key shaft may be rotated in one direction, said arm also including a finger adapted to bear against a film and pass through an aperture therein whereby the winding key shaft is controlled through the clutch elements, arm, and fingers by the film.

9. In a camera adapted for use with roll film having a perforation therein for each exposure, the combination with a camera body, of spool chambers included in the body, a winding key shaft extending through a wall of said chamber, an arm mounted to turn a limited distance about the key shaft, a clutch block including a plurality of cam surfaces disposed about the key shaft, rotatable clutch elements between the cams and key shaft, springs tending to hold pairs of clutch elements in position to prevent the key shaft from turning in either direction, the arm including a plurality of fingers adapted to contact with certain clutch elements and to move them against the spring thrust from the cams whereby the key shaft may be rotated in one direction, said arm also including a finger adapted to bear against a film and pass through an aperture therein, and means extending to the outside of the camera casing for moving the arm in a direction to remove the finger from a film aperture.

CHESTER W. CRUMRINE.